(12) United States Patent
Xie et al.

(10) Patent No.: US 8,909,573 B2
(45) Date of Patent: *Dec. 9, 2014

(54) DEPENDENCY-BASED QUERY EXPANSION ALTERATION CANDIDATE SCORING

(71) Applicant: Microsoft Corporation, Redmond, WA (US)

(72) Inventors: Shasha Xie, Richardson, TX (US); Xiaodong He, Issaquah, WA (US); Jianfeng Gao, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/952,864

(22) Filed: Jul. 29, 2013

(65) Prior Publication Data

US 2013/0311504 A1   Nov. 21, 2013

Related U.S. Application Data

(63) Continuation of application No. 12/951,068, filed on Nov. 22, 2010, now Pat. No. 8,521,672.

(51) Int. Cl.
*G06F 15/18*   (2006.01)
*G06E 1/00*   (2006.01)
*G06E 3/00*   (2006.01)
*G06G 7/00*   (2006.01)
*G06F 17/30*   (2006.01)

(52) U.S. Cl.
CPC .... *G06F 17/30967* (2013.01); *G06F 17/30672* (2013.01)
USPC .......................................................... 706/20

(58) Field of Classification Search
None
See application file for complete search history.

(56) References Cited

U.S. PATENT DOCUMENTS

| 8,521,672 B2 * | 8/2013 | Xie et al. ........................ 706/20 |
| 2012/0131031 A1 * | 5/2012 | Xie et al. ...................... 707/765 |
| 2013/0311504 A1 * | 11/2013 | Xie et al. ...................... 707/765 |

* cited by examiner

*Primary Examiner* — Michael B Holmes
(74) *Attorney, Agent, or Firm* — Sandy Swain; Judy Yee; Micky Minhas

(57) ABSTRACT

An alteration candidate for a query can be scored. The scoring may include computing one or more query-dependent feature scores and/or one or more intra-candidate dependent feature scores. The computation of the query-dependent feature score(s) can be based on dependencies to multiple query terms from each of one or more alteration terms (i.e., for each of the one or more alteration terms, there can be dependencies to multiple query terms that form at least a portion of the basis for the query-dependent feature score(s)). The computation of the intra-candidate dependent feature score(s) can be based on dependencies between different terms in the alteration candidate. A candidate score can be computed using the query dependent feature score(s) and/or the intra-candidate dependent feature score(s). Additionally, the candidate score can be used in determining whether to select the candidate to expand the query. If selected, the candidate can be used to expand the query.

20 Claims, 3 Drawing Sheets

DEPENDENCY-BASED QUERY EXPANSION ALTERATION CANDIDATE SCORING

RELATED APPLICATIONS

The present application is a continuation of U.S. application Ser. No. 12/951,068, filed Nov. 22, 2010, which is incorporated herein by reference. If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

BACKGROUND

One problem in information retrieval is the lexical gap between query words and the words in documents to be retrieved in response to the query. Query expansion seeks to address this problem by expanding the original query in an attempt to produce a variant of the original query that will help the search engine to find more relevant documents.

For example, original queries have been expanded using similar variants of the query terms. For example, lexical databases (e.g., the WordNet® database) have been used to find synonyms of query words, and those query words have been used to expand the original query. Such words may be ones with high co-occurrence to the query terms, or frequent words from top-ranked retrieved documents. Additionally, some techniques have considered the original query and its alteration candidates as translation pairs, and statistical machine translation models have been used to rank these candidates according to translation probabilities. For example, the use of a word-based translation model for ranking has been performed by assuming that the alteration words are independent to each other; and that each alteration word is aligned and generated from only one query word.

SUMMARY

The tools and techniques described herein can include tools and techniques for scoring alteration candidates that may be used to expand queries, so that the scores can be used to determine which, if any, of the candidates to user for expanding a given query. As used herein, an alteration candidate is a set of terms that correspond to terms in a query, where the candidate is considered for potential use in expanding the query. An alteration candidate includes one or more terms that differ from the terms in the query, but the candidate may also include one or more words that are the same as the query. The scoring of a query alteration candidate can be based on dependencies between terms in the query alteration candidate (intra-candidate dependencies), and/or dependencies between each of one or more terms in the candidate and terms in the query (query-dependent dependencies). Considering these dependencies can allow for more useful query alteration candidates to be chosen for expanding a query. As used herein, a dependency refers to a relationship that can be represented in a computation to produce a score. For example, dependencies may be evaluated and represented using word counting language models, translation models, etc.

In one embodiment, the tools and techniques can include scoring an alteration candidate for a query. The scoring may include computing one or more query-dependent feature scores and/or one or more intra-candidate dependent feature scores. The computation of the query-dependent feature score(s) can be based on dependencies to multiple query terms from each of one or more alteration terms (i.e., for each of the one or more alteration terms, there can be dependencies to multiple query terms that form at least a portion of the basis for the query-dependent feature score(s)). The computation of the intra-candidate dependent feature score(s) can be based on dependencies between different terms in the alteration candidate. A candidate score can be computed using the query dependent feature score(s) and/or the intra-candidate dependent feature score(s). The candidate score can be used in determining whether to select the candidate to expand the query. If selected, the candidate can be used to expand the query. The candidate scoring, candidate selection, and the use for query expansion may be performed for multiple alteration candidates for a query.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

DETAILED DESCRIPTION

Figure 1:
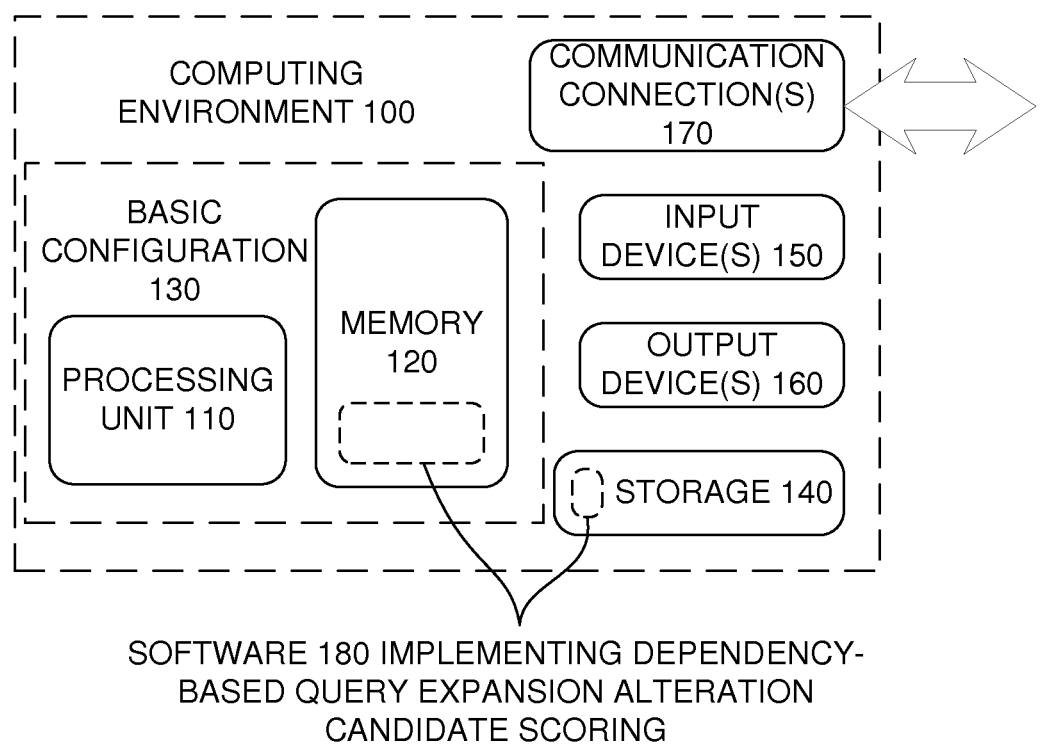
FIG. 1 is a block diagram of a suitable computing environment in which one or more of the described embodiments may be implemented.

Embodiments described herein are directed to techniques and tools for improved selection of query alteration candidates for query expansion. Such improvements may result from the use of various techniques and tools separately or in combination.

Such techniques and tools may include scoring query alteration candidates of a given query using scoring techniques that are based on dependencies between terms in the alteration candidate (such as between an alteration term and itself or between an alteration term and another alteration term), and between terms in the candidate and terms in the query. As an example, a scoring technique may be performed according to a Markov random field framework for scoring alteration candidates for a give query. The framework can be represented as a fully connected graph, where all the alteration terms are dependent on each other, and each alteration word is dependent on the query overall. The phase "query overall" refers to the terms of the whole query according to a scheme, which may exclude consideration of words that often do not provide useful information, e.g., the, a, an, etc. Under this framework, multiple features can be defined to represent different levels of dependencies, including different kinds of alteration language model scores, different types of translation models to measure dependencies between the alteration terms and the query overall. The alteration candidate and the query can be evaluated using these features to produce feature scores, and the feature scores can be combined (with properly trained weights) to produce a score for an alteration candidate. Each alteration candidate score can be used to determine whether the corresponding candidate is to be used to expand the query. For example, every candidate with a score that exceeds a predetermined minimum score can be used, every candidate with a score that exceeds the predetermined minimum score can be used up to a maximum number of candidates, a predetermined number of candidates with the highest scores can be used, etc.

Using the different dependencies herein to score the alteration candidates can capture context information that would otherwise be missed to improve the selection of query alteration candidates for query expansion. Other benefits may also be realized by the use of the tools and techniques for query expansion alteration candidate scoring, as described herein.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. For example, the various procedures described herein may be implemented with hardware or software, or a combination of both. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used as an environment for scoring query alteration candidates, selecting query alteration candidates for use in query expansion, and/or using query alteration candidates to expand a query. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing dependency-based query expansion alteration candidate scoring.

Although the various blocks of FIG. 1 are shown with lines for the sake of clarity, in reality, delineating various components is not so clear and, metaphorically, the lines of FIG. 1 and the other figures discussed below would more accurately be grey and blurred. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include computer-readable storage media such as magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable storage media. Computer-readable storage media are any available storage media that can be accessed within a computing environment, but computer-readable storage media do not include signals per se. By way of example, and not limitation, with the computing environment (100), computer-readable storage media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Dependency-Based Query Expansion Alteration Candidate Scoring System and Environment

A. Overview of the Environment and Technique

Figure 2:
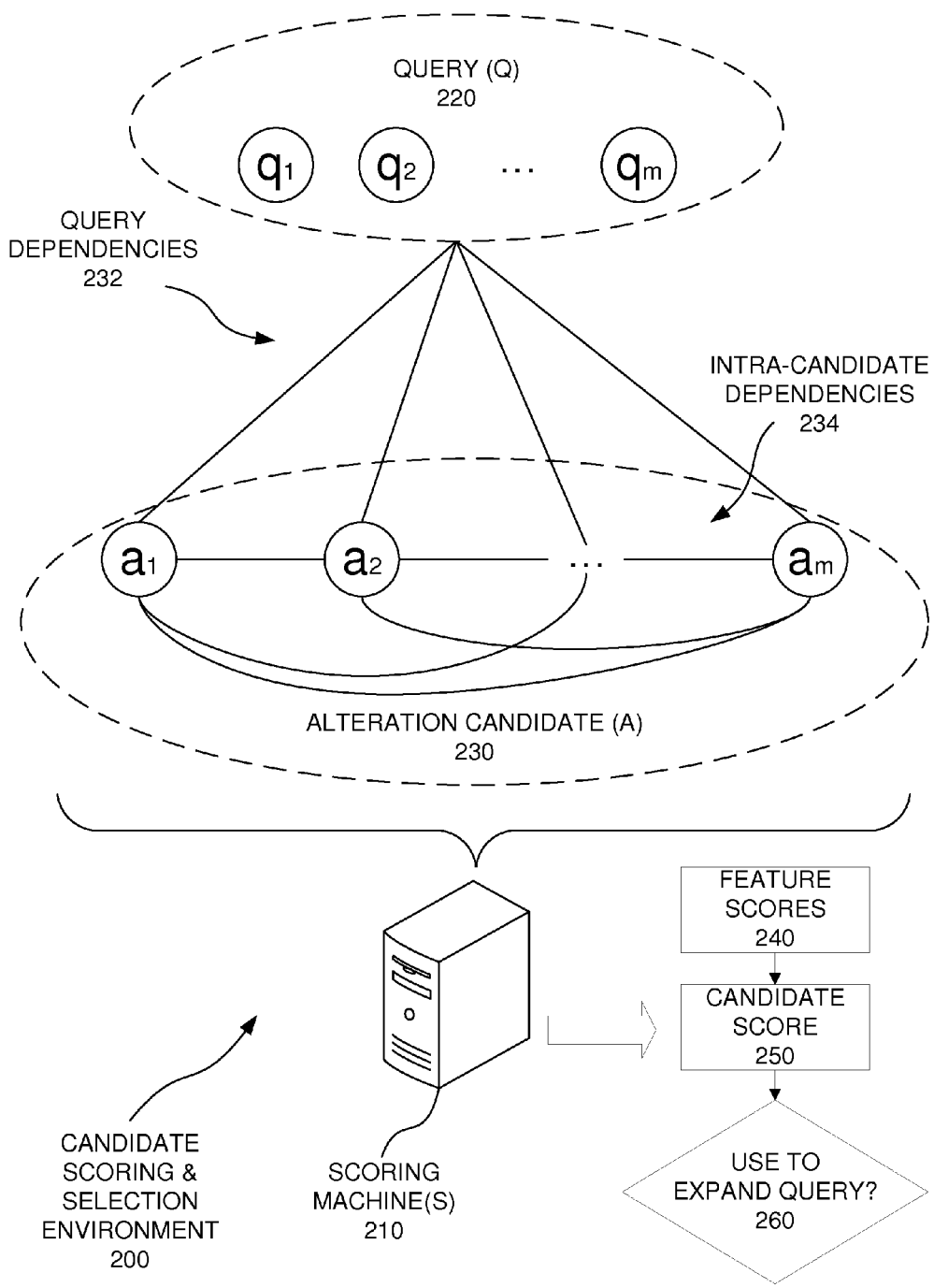
FIG. 2 is a schematic diagram of query expansion candidate scoring and selection environment.

FIG. 2 is a schematic diagram of a query expansion alteration candidate scoring and selection environment (200) in conjunction with which one or more of the described embodiments may be implemented. The environment (200) can include one or more physical and/or virtual scoring machines (210) that can analyze pairs that each include a query (220), and an alteration candidate (230) for the query (220). The query can have terms $q_1, q_2 \ldots q_n$, and the alteration candidates (230) can have terms $a_1, a_2 \ldots a_m$. As used herein, alteration candidates will generally be referred to with the notation A, with alteration terms being referred to with the notation $a_i$ for the ith term in A. Similarly, queries will generally be referred to with the notation Q, with query terms being referred to with the notation $q_j$ for the jth term in Q. The query (220) may have the same number of terms as the query candidate (230) in FIG. 2, or a query candidate may have a different number of terms from a query. Also, a query or candidate "term", as used herein, refers to a portion of a query or candidate. Accordingly, a term may be a single word (which may be a word, symbol, number, etc.) or it may be multiple words. The scoring machine(s) (210) can take the alteration candidate (230) and the query (220), and perform a scoring technique for the alteration candidate (230).

The scoring machine(s) (210) can evaluate query dependencies (232) of each term in the alteration candidate (230), as well as intra-candidate dependencies (234) to produce feature scores (240). The feature scores (240) may also include scores that are not based on these dependencies, such as a feature score for a length of the query (220) and/or a feature score based on an estimate of a probability of the query, given itself. The scoring machine(s) (210) can combine the feature scores (240) for the alteration candidate (230) to produce an overall candidate score (250), which can be used in a determination (260) of whether to select the candidate (230) to expand the query (220). The scoring machine(s) may perform this technique for multiple alteration candidates (230) for a query (220), and may select all, some, or none of those candidates (230) to expand the query (220).

III. Alteration Candidate Scoring Implementation Example Using a Markov Random Field Framework A Markov random field G can be used to represent dependency of a query Q and its alteration candidate A. The following sub-sections will discuss a derivation of a general scoring framework using the concept of a Markov random field, followed by a sub-section that includes a discussion of the scoring technique implementation using that general scoring framework and feature scoring functions.

A. Derivation of a General Alteration Candidate Scoring Framework

A joint probability of Q and A can be represented using a Markov random filed G according to Equation 1 below:

$$P_\Lambda(Q, A) = \frac{1}{Z_\Lambda} \prod_{c \in C(G)} \varphi(c; \Lambda) \quad \text{Equation 1}$$

In Equation 1, $P_\Lambda(Q, A)$ represents the joint probability of Q and A, utilizing the parameters $\Lambda$. Here, Q can contain n query terms $\{q_1, q_2, \ldots, q_n\}$, and A can contain m alteration terms $\{a_1, a_2, \ldots, a_m\}$. C(G) is the set of cliques in G. A clique c is a set of nodes in G where all the nodes in the set are connected by a dependency (i.e., all the nodes of the subset are represented by a dependency "edge" in a dependency graph of G). Each function $\phi(c; \Lambda)$ is a non-negative potential function over a clique c, with input parameters $\Lambda$. $Z_\Lambda$ can normalize the distribution given by Equation 1 so that $P_\Lambda(Q, A)$ sums to one over all (Q,A) pairs, i.e., $Z_\Lambda$ can be given by Equation 2 below, where the variables are the same as in Equation 1 above.

$$Z_\Lambda = \sum_{Q, A} \prod_{c \in C(G)} \varphi(c; \Lambda) \quad \text{Equation 2}$$

Given an input query Q and alteration candidates for Q, each alteration candidate A can be scored with an estimation of the probability of A given Q that utilizes the joint probability of Q and A as provided in Equation 3 below.

$$P_\Lambda(A \mid Q) = \frac{P_\Lambda(Q, A)}{P_\Lambda(Q)} \propto P_\Lambda(Q, A) \propto \text{EXP}\left(\sum_{c \in C(G)} \log \varphi(c; \Lambda)\right) \quad \text{Equation 3}$$

In Equation 3 and elsewhere in this application, "EXP" of a value n refers to $e^n$, and log of a value n refers to a natural log of n. However, other log bases (e.g., base 10 or base 2) and corresponding exponentiation functions could be used instead. As is shown in Equation 3, the probability of A given Q can be represented as the joint probability of Q and A, divided by the probability of Q, which is proportional to the joint probability of Q and A (dropping the denominator). That joint probability is proportional to the exponentiation of the summation of log $\phi(c; \Lambda)$ over all the cliques in G.

The functions (c; $\Lambda$) can each be a non-negative feature function over clique values with a weight given to that particular feature function, and the exponentiation function can be dropped so that a score for each alteration candidate is scaled, and the last term of Equation 3 can be rewritten as the scoring function S given by Equation 4 below:

$$S_\Lambda(A, Q) = \sum_{c \in C(G)} \lambda_c \log f(c) \qquad \text{Equation 4}$$

Here, $S_A$ (A, Q) represents the scoring function for the alteration candidate A for the query Q, parameterized by Λ. Each clique c in the overall set of cliques C(G) can represent a level of dependency, or a different type of dependency, between and/or within Q and/or A. Each feature function $f$(c) can represent the dependency of the clique c, and evaluating the function can produce a feature score. The log of each such feature score can be taken to scale the feature score, and that log value can be multiplied by a weighting factor $\lambda_c$ for the feature score. These weighted and scaled feature scores $\lambda_c \log f$ (c) can be summed to produce a candidate score for the alteration candidate A. While the scoring function $S_A$ (A, Q) may have its roots in the probability of A given Q, the scoring function need not be equal to or even proportional to the actual probability. Instead, the scoring function can be based on feature functions $f$ (c) that represent dependencies to provide useful information to determine whether the alteration candidate A is to be used in expanding the query Q. For example, A may be selected to expand Q because A's candidate score exceeds a predetermined threshold, and/or because the score is greater than the score(s) of other candidate(s). The predetermined threshold, as well as the weighting factors $\lambda_c$ and other parameters (e.g., α, β, and γ discussed below) can be set while evaluating the scoring function using training data.

B. Feature Functions in the Alteration Candidate Scoring Framework

As noted above with reference to FIG. 2, the dependencies to be represented by the alteration candidate scoring framework can form a fully connected graph, as shown in FIG. 2. Under this graph, it can be assumed that all the alteration terms are dependent on each other and that the alteration words are dependent on the query overall, which is different from typical word-based translation models where all the alteration words are considered to be independent of each other, and each alteration word is considered to be aligned and generated from only one query word. Each alteration term can be connected by dependency, not only to its neighbor terms, but to all the other terms in the alteration sentence, which can represent the "long-distance" dependencies in the alteration candidate side. Secondly, each alteration term can have a dependency to the query sentence overall (i.e., the terms of the whole query according to a scheme, which may exclude consideration of words that often do not provide useful information, e.g., the, a, an, etc.), such as to the entire query sentence. This can allow the consideration not only of one specific query term, but other terms on the query side. In the following sub-sections, the feature functions for representing these dependencies under this framework will be described. In the description, the terms in the query and in the alteration candidate will each be considered to be a single word for the sake of simplicity, so "term" and "word" will be used interchangeably in this portion of the description. However, as will be discussed below, the features could be modified so that terms could each have a single word or multiple words (e.g., terms could be words or short phrases). For example, if each term is a single word, then the models discussed herein can be word-based models, and if terms include multiple words, then the models discussed herein can be phrase-based models. Moreover, the models could use a mixture of words and phrases (e.g., word-based counts and phrase-based counts).

1. Alteration Length

A first feature function $f_1(A)$ can be applied to compute a feature score based on the length of the alteration candidate, which can be considered a dependency on the overall alteration candidate A. The feature function can be computed according to Equation 5 below, where the feature is a function of the words $a_1, a_2, \ldots, a_m$ in A, and where |A| is the number of words in A.

$$f_1(A) = f_1(a_1, a_2, \ldots, a_m) = \text{EXP}(|A|) \qquad \text{Equation 5}$$

2. Self-Translation Probability

A second feature function $f_2(Q)$ can be applied to compute a feature score according to Equation 6 below.

$$f_2(Q) = \log P_{WMT}(Q|Q) \qquad \text{Equation 6}$$

In Equation 6, $P_{WMT}(Q|Q)$ represents the probability of Q to itself. This can be computed using a word-based translation model. For example, the word-based translation model may be an expected counts type of translation model based on IBM® translation models.

3. Alteration Unigram Score

A third feature function $f_3(A)$ can be computed to produce an alteration unigram feature score. The score can be computed as a product of the unigram score $f_3(a_i)$ for each word $a_i$ in A, where $f_3(a_1)$ is a unigram language model score of each alteration word, which can be calculated using a word counting language model with a vocabulary of words and counts for those words. The score for each word can be calculated according to Equation 7 below for alteration words in the vocabulary of the model.

$$f_3(a_i) = \log P(a_i) = \log \frac{C(a_i)}{\sum_{i \in |V|} C(a_i)} \qquad \text{Equation 7}$$

The numerator $C(a_i)$ refers to the count for the word $a_i$ in the training corpus of the language model, while the denominator $$\sum_{i \in |V|} C(a_i)$$

refers to the summation of the counts for all words in the language model. For alteration words that are not in the vocabulary of the model, the score for each word can be calculated according to Equation 8 below, which has similar notations to Equation 7 above.

$$f_3(a_i) = \log P(a_i) = \log \frac{.5}{\sum_{i \in |V|} C(a_i)} \qquad \text{Equation 8}$$

Thus, alteration words that are not in the vocabulary get one-half of a count when computing this feature score.

4. Alteration Adjacent Bigram Score

A fourth feature function $f_4(A)$ can be computed to produce an alteration adjacent bigram feature score. The score can be computed as a product of the pair bigram scores $f_4(a_i, a_{i+1})$ for each adjacent bigram word pair $a_i, a_{i+1}$ in A. Each pair bigram score $f_4(a_i, a_{i+1})$ can be a bigram language model score of an adjacent word pair in the alteration candidate. The score $f_4(a_i, a_{i+1})$ for each adjacent word pair can be computed using n-gram counting. Specifically, the score $f_4(a_i, a_{i+1})$ for each adjacent word pair can be calculated as a probability of $a_{i+1}$ given $a_i$, noted as $P(a_{i+1}|a_i)$, according to Equation 9 below for adjacent word pairs with words in the vocabulary of the n-gram counting model.

$$f_4(a_i, a_{i+1}) = \log P(a_{i+1} | a_i) = \log \frac{C(a_i, a_{i+1})}{C(a_i)} \quad \text{Equation 9}$$

The numerator $C(a_i, a_{i+1})$ refers to co-occurrences of the word pair in the same sentence in the language model training corpus, and the denominator $C(a_i)$ refers to the count for the word $a_i$ in the language model training corpus. If either of the words in the pair is not in the vocabulary of the model, e.g., unseen in the training corpus, the score for the word pair can be calculated according to Equation 10 below, which has similar notations to the equations above.

$$f_4(a_i, a_{i+1}) = \log \frac{.5}{\sum_{i \in |V|} C(a_i)} \quad \text{Equation 10}$$

Thus, for pairs with words that are not in the vocabulary, the pair gets one-half of a count when computing this feature score.

5. Alteration Skip-Bigram Score

A fifth feature function $f_5(A)$ can be computed to produce an alteration skip-bigram feature score. The score can be computed as a product of pair bigram scores with a function $f_5(a_i, a_j)$ for each non-adjacent bigram word pair $a_i, a_j$ in A. Each pair skip-bigram score can be a bigram language model score of a non-adjacent word pair in the alteration candidate. The score for each non-adjacent word pair can be computed using word pair co-occurrence. Specifically, the score for each adjacent word pair can be calculated as an estimate of the mutual information of the word pair $(a_i, a_j)$ according to Equation 11 below for non-adjacent word pairs with words in the vocabulary of the word pair co-occurrence language model.

$$f_5(a_i, a_j) = \log \frac{C(a_i, a_j)}{C(a_i) C(a_j)} \quad \text{Equation 11}$$

In Equation 11, the numerator $C(a_i, a_j)$ refers to a count of co-occurrences of the word pair in the same sentence in the training data corpus, and the denominator is the product of the separate counts of the two words in the training data corpus. When a count in the training data corpus is zero, the count can be assigned a value of 0.5 as a count backoff.

6. Word Translation Feature Score

A sixth feature function $f_6(A, Q)$ can be computed to produce a word translation feature score. The score can be computed as a product of word translation feature scores with a function $f_6(a_i, Q)$ for each word in A. This feature function can be based on the dependency of each alteration word and the query overall, which may be a dependency to the entire query, or the query with consideration of some words being excluded (e.g., a, the, an, etc.) For example, the score for each word can be calculated as a probability of the word $a_i$ given the query Q, i.e., $P(a_i|Q)$, according to Equation 12 below.

$$f_6(a_i, Q) = \log P(a_i | Q), \quad \text{Equation 12}$$

where $$P(a_i | Q) = \alpha \times \frac{1}{|Q|} \sum_{j=1}^{n} P_1(a_i | q_j) + \beta \times \frac{1}{|Q|-1} \sum_{j=1}^{n-1} P_2(a_i | q_j, q_{j+1}) +$$

$$\gamma \times \frac{1}{|Q|(|Q|-1)} \sum_{j=1}^{n} \sum_{\substack{j'=1 \\ j' \neq j}}^{n} P_3(a_i | q_j, q_{j'}) +$$

$$(1 - \alpha - \beta - \gamma) \times P_4(a_i)$$

This computation introduces three different types of translation models to generate this feature score, in order to utilize information from the query sentence in its entirety, using all query words.

First, the alteration word $a_i$ can be considered to be generated from only one query word, which can be modeled as a word-based translation model, given as $P_1(a_i|q_j)$, summed for all words $q_j$ in the query Q and multiplied by a tuning constant $\alpha$.

Second, to consider more query side information, another model can be a bigram-based translation model that produces a score $P_2(a_i|q_j,q_{j+1})$, where the generation of an alteration word is dependent on an adjacent pair $(q_j, q_{j+1})$ in the query. The bigram-based translation model scores can be summed for all the adjacent query pairs and multiplied by a tuning constant $\gamma$.

Third, the query side information can be further exploited using a lexicon triplet translation model to produce a score $P_3(a_i|q_j,q_{j'})$. In this model, the alteration word $a_i$ is triggered by two query words $(q_j,q_{j'})$, where the trigger words can be any word pair in the query. This lexicon triplet translation model can consider longer distance information than the previous translation models. The scores can be summed for all the word pairs in the query and multiplied by a tuning constant $\beta$.

Additionally, the scores from these three translation models can be linearly interpolated by adding to them the product of the difference of 1 and the tuning constants $(1-\alpha-\beta-\gamma)$, and a unigram language model score $P_4(a_i)$ of the alteration word, which can be computed use word counting, as discussed above.

The tuning constants may be adjusted while evaluating training data to provide appropriate values. Additionally, all the translation models can be based on the IBM® translation models.

7. Adjacent Bigram Translation Feature Score

A seventh feature function $f_7(A, Q)$ can be computed to produce an adjacent bigram translation feature score. This score can be computed as a product of feature scores for each adjacent word pair in the alteration candidate, where the word pair feature scores each represent a dependency between the alteration candidate word pair and the query overall, which may include a representation between the word pair and the entire query. For each adjacent word pair, the feature score $f_7(a_i, a_{i+1}, Q)$ is an estimate of the probability of the word pair given the query $P(a_i,a_{i+1}|Q)$. If it is assumed that the query words are independent to each other, then according to Bayesian rules, the feature function for each word pair can be computed as an estimate of the joint probability of the pair, multiplied by the probability of the query given the pair, and divided by the probability of the query, according to Equation 13 below.

$$f_7(a_i, a_{i+1}, Q) = \text{Equation 13}$$

$$\log P(a_i, a_{i+1} \mid Q) = \frac{P(a_i, a_{i+1}) \times P(Q \mid a_i, a_{i+1})}{P(Q)} =$$

$$\log \frac{P(a_i)P(a_{i+1} \mid a_i) \times \prod_{j=1}^{n} P(q_j \mid a_i, a_{i+1})}{\prod_{j=1}^{n} P(q_j)}$$

The feature score for the pair is finally computed as shown in Equation 13 above using the alteration unigram score $P(a_i)$, the bigram score $P(a_{i+1}|a_i)$, unigram scores for the query words $P(q_j)$, and the bigram-based translation model score $P(q_j|a_i,a_{i+1})$ from alteration candidate to query. This translation model is similar to the previously discussed bigram-based translation model, only in the opposite direction.

8. Skip-Bigram Translation Feature Score

An eighth feature function $f_8(A, Q)$ can be computed to produce a skip bigram translation feature score. This score can be computed as a product of feature scores for each non-adjacent word pair in the alteration candidate, where the word pair feature scores each represent a dependency between the alteration candidate word pair and the query overall, which may include a dependency between the word pair and the entire query. For each non-adjacent word pair, the feature score $f_8(a_i,a_j,Q)$ is an estimate of the probability of the word pair given the query $P(a_i,a_j|Q)$. Similar to the calculation of the previous feature, it can also be assumed with this feature that the query words are independent. Accordingly, the probability can be given by the joint probability of the word pair $P(a_i,a_j)$ multiplied by the probability of the query given the word pair $P(Q|a_i,a_j)$, and divided by the probability of the query $P(Q)$. Accordingly, the feature score for each non-adjacent word pair can be computed according to Equation 14 below.

$$f_8(a_i, a_j, Q) = \text{Equation 14}$$

$$\log P(a_i, a_j \mid Q) = \log \frac{P(a_i, a_j) \times P(Q \mid a_i, a_j)}{P(Q)} =$$

$$\log \frac{P(a_i)P(a_i, a_j) \times \prod_{k=1}^{n} P(q_k \mid a_i, a_j)}{\prod_{k=1}^{n} P(q_k)}$$

Here, $P(q_k)$ is the query unigram score, $P(a_i,a_j)$ is the query skip-bigram score which is calculated using word pair co-occurrence, and $P(q_k|a_i,a_j)$ is the translation probability from alteration candidate to query using triplet translation models discussed above.

C. Combining the Feature Scores

The feature scores can be combined by multiplying each score by the weighting factor $\lambda$ for that feature, and summing all the weighted scores according to Equation 15 below.

$$S(A, Q) = \lambda_1 f_1(A) + \lambda_2 f_2(Q) + \lambda_3 f_3(A) + \lambda_4 f_4(A) + \text{Equation 15}$$
$$\lambda_5 f_5(A) + \lambda_6 f_6(A, Q) + \lambda_7 f_7(A, Q) + \lambda_8 f_8(A, Q)$$

In Equation 15, logs of the overall feature scores may not be performed as in Equation 4 above because the logs of the probability values within the feature functions were already taken to scale the values, and in an effort to avoid rounding errors. Alternatively, logs (or other scaling techniques) could be performed on the overall feature scores in addition to or instead of taking logs or otherwise scaling values used to arrive at the feature scores.

While an implementation of an alteration candidate scoring framework has been described, different frameworks could be used. For example, one or more of the features described above could be omitted, one or more of the features could be modified, and/or other features could be included. Also, one or more of the features above that operate on a per-word basis could operate on a per-phrase basis, with each term including one or more phrases. For example, this could be done by expanding vocabulary, counts, etc. used in the models to include phrases in addition to single words.

IV. Dependency-Based Query Expansion Alteration Candidate Scoring Technique

A dependency-based query expansion alteration candidate scoring technique will now be discussed. The acts and features in the technique can be used together or separately, and the technique can be performed in a computing environment. For example, the technique may be performed in a computer system that includes at least one processor and a memory including instructions stored thereon that when executed by the at least one processor cause the at least one processor to perform the technique (a memory stores instructions (e.g., object code), and when the processor(s) execute(s) those instructions, the processor(s) perform(s) the technique). Similarly, one or more computer-readable storage media may have computer-executable instructions embodied thereon that, when executed by at least one processor, cause the at least one processor to perform the technique.

Figure 3:
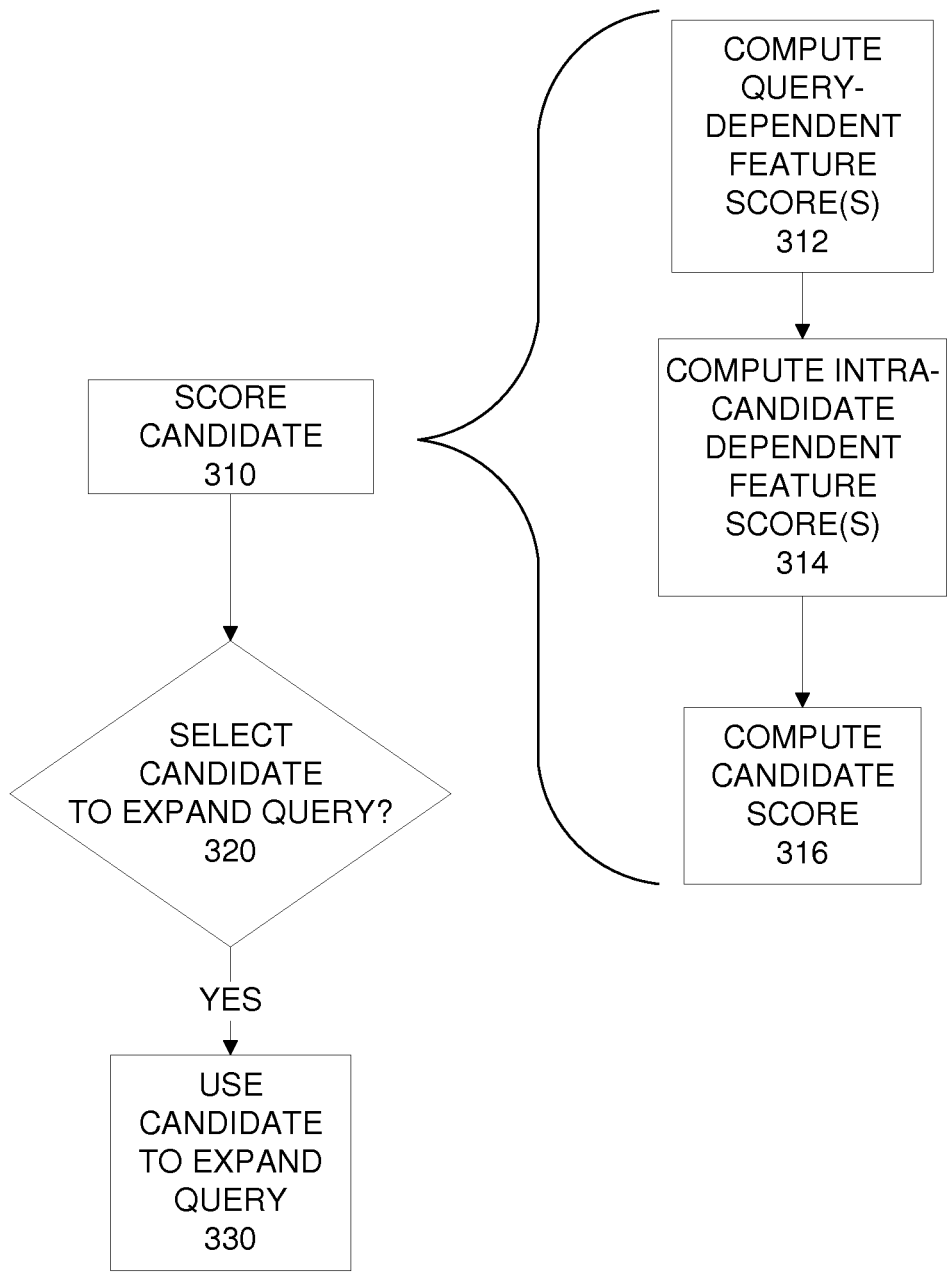
FIG. 3 is a flowchart of a dependency-based query expansion alteration candidate scoring technique.

Referring to FIG. 3, a dependency-based query expansion alteration candidate scoring technique will be described. The technique can include scoring (310) an alteration candidate for a query. The candidate can include multiple alteration terms, and the query can include multiple query terms. The terms may each be a single word or multiple words. Scoring (310) the candidate can include computing (312) one or more query-dependent feature scores, as well as computing (314) one or more intra-candidate dependent feature scores. The query-dependent feature score(s) and/or the intra-candidate-dependent feature score(s) can be used to compute (316) a candidate score for the alteration candidate. It can be determined (320) whether to select the candidate to expand the query. This determination (320) can be made using the candidate score.

The query dependent feature scores can be based on dependencies to multiple query terms from each of one or more of the alteration terms. At least one of the query-dependent feature score(s) can be based on one or more dependencies between at least one of the alteration terms and the query overall, such as each alteration term and the entire query. The query-dependent feature score(s) can include one or more bigram scores that are based on dependencies between a pair of the alteration terms and multiple terms in the query. The query-dependent feature scores may also include one or more term dependency scores based on dependencies between an alteration term and a plurality of query terms. The computation of at least a portion of one or more query-dependent feature scores can be based on a translation model (i.e., based at least in part on such a model). Indeed, the query dependent feature score(s) can be based on a plurality of translation models (e.g., a word translation model, a bigram translation model, a triplet translation model, etc.). For example, the query dependent feature score(s) can include term dependency score(s) representing dependencies between each of one or more terms of the candidate and one or more terms of the query, as well as bigram translation score(s) representing dependencies between one or more pairs of candidate terms of the candidate and one or more terms of the query.

The intra-candidate dependent feature score(s) can be based on dependencies between different terms in the alteration candidate. The intra-candidate dependent feature score(s) may be based on dependencies between all the terms in the alteration candidate (i.e., each term of the candidate and each other term of the candidate). For example, the intra-candidate dependent feature score(s) can include one or more adjacent bigram scores for one or more (and possibly all) adjacent term pairs in the candidate and/or one or more skip-bigram scores for one or more (and possibly all) non-adjacent term pairs in the candidate. The computation of the intra-candidate dependent feature score(s) can be based on one or more word count models (i.e., based at least in part on such models).

The intra-candidate dependent feature score(s) can also include one or more unigram feature scores based on based on the alteration terms. Additionally, a length feature score can be computed based on the length of the candidate (such as a number of terms in the candidate) as part of the candidate score computation. Also, a translation model score from the query itself can be used in the candidate score computation.

If the candidate is selected to expand the query, then the candidate can be used (330) to expand the query. For example, terms in the alteration candidate that are not already part of the query can be added to the query as alternatives (OR operations) to existing query terms. Thus, an expanded query may include word columns, where each column includes a query term, and each column may also include one or more alteration terms connected to the query term with the equivalent of an OR operator. This expanded query may then be submitted to a search engine, and results from the search can be returned, where the results are based on the expanded query, including the query terms and the alteration terms, if any, from one or more alteration candidates.

The technique of FIG. 3 may be performed for multiple alteration candidates for expanding a query. Accordingly, all the candidates can be scored (310), it can be determined (320) for each candidate whether to select the candidate using the corresponding candidate score for that candidate, and the selected candidate(s), if any, can be used (330) to expand the query.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method, comprising:
    scoring an alteration candidate for a query, the alteration candidate comprising multiple alteration terms, the query comprising multiple query terms, and the scoring comprising:
        computing one or more query-dependent feature scores that are based on dependencies to multiple query terms from each of one or more of the alteration terms;
        computing one or more intra-candidate-dependent feature scores that are based on dependencies between different terms in the alteration candidate; and
        computing a candidate score for the candidate using the one or more query-dependent feature scores and the one or more intra-candidate-dependent feature scores; and
    determining whether to select the candidate to expand the query, the determination using the candidate score.

2. The method of claim 1, wherein at least one of the one or more query-dependent feature scores is based on a dependency between at least one of the alteration terms and the query overall.

3. The method of claim 1, wherein the one or more query-dependent feature scores comprise one or more bigram scores that are based on dependencies between a pair of the alteration terms and multiple terms in the query.

4. The method of claim 1, wherein the query-dependent feature scores comprise one or more term dependency scores based on dependencies between an alteration term and a plurality of query terms.

5. The method of claim 1, wherein at least a portion of the one or more query-dependent feature scores are based on one or more translation models.

6. The method of claim 1, wherein the one or more intra-candidate dependent feature scores are based on dependencies between all the terms in the alteration candidate.

7. The method of claim 1, wherein the intra-candidate-dependent feature scores comprise one or more adjacent bigram scores and one or more skip bigram scores.

8. A computer system comprising:
    at least one processor; and
    a memory comprising instructions stored thereon that when executed by the at least one processor cause the at least one processor to perform acts comprising:
        scoring an alteration candidate for a query, the alteration candidate comprising multiple alteration terms, the query comprising multiple query terms, and the scoring comprising:
            computing one or more intra-candidate dependent feature scores that are based on dependencies between different terms in the alteration candidate, the intra-candidate dependent feature scores comprising at least one skip bigram score; and
            using the one or more intra-candidate dependent feature scores to compute a candidate score for the candidate; and
        determining whether to select the candidate to expand the query, the determination using the candidate score.

9. The computer system of claim 8, wherein the intra-candidate-dependent feature scores comprise one or more adjacent bigram scores.

10. The computer system of claim 8, wherein the one or more intra-candidate dependent feature scores are based on dependencies between all the terms in the alteration candidate.

11. The computer system of claim 8, wherein scoring the alteration candidate further comprises:
    computing one or more query-dependent feature scores that are based on dependencies to multiple query terms from each of one or more of the alteration terms; and
    using the one or more query-dependent feature scores to compute the candidate score for the candidate.

12. The computer system of claim 11, wherein the one or more query-dependant feature scores comprises a plurality of feature scores based on a plurality of translation models.

13. The computer system of claim 11, wherein the one or more query-dependant feature scores is based on one or more dependencies between at least one of the alteration terms and the query overall.

14. One or more computer-readable storage media having computer-executable instructions embodied thereon that, when executed by at least one processor, cause the at least one processor to perform acts comprising:
- scoring an alteration candidate for a query, the alteration candidate comprising multiple alteration terms, the query comprising multiple query terms, and the scoring comprising:
  - computing one or more query-dependent feature scores that are based on dependencies to multiple query terms from each of one or more of the alteration terms;
  - computing one or more intra-candidate-dependent feature scores that are based on dependencies between different terms in the alteration candidate; and
  - computing a candidate score for the candidate using the one or more query-dependent feature scores and the one or more intra-candidate-dependent feature scores; and
- determining whether to select the candidate to expand the query, the determination using the candidate score.

15. The one or more computer-readable storage media of claim 14, wherein at least one of the one or more query-dependent feature scores is based on a dependency between at least one of the alteration terms and the query overall.

16. The one or more computer-readable storage media of claim 14, wherein the one or more query-dependent feature scores comprise one or more bigram scores that are based on dependencies between a pair of the alteration terms and multiple terms in the query.

17. The one or more computer-readable storage media of claim 14, wherein the query-dependent feature scores comprise one or more term dependency scores based on dependencies between an alteration term and a plurality of query terms.

18. The one or more computer-readable storage media of claim 14, wherein at least a portion of the one or more query-dependent feature scores are based on one or more translation models.

19. The one or more computer-readable storage media of claim 14, wherein the one or more intra-candidate dependent feature scores are based on dependencies between all the terms in the alteration candidate.

20. The one or more computer-readable storage media of claim 14, wherein the intra-candidate-dependent feature scores comprise one or more adjacent bigram scores and one or more skip bigram scores.

* * * * *